United States Patent
Al-Ofi et al.

(10) Patent No.: US 12,104,487 B2
(45) Date of Patent: Oct. 1, 2024

(54) DETERMINE A FORMATION'S TEXTURAL PARAMETERS USING ADVANCING LOGGING DATA

(71) Applicants: Salah Al-Ofi, Al-Khobar (SA); Bilal Saad, Al-Khobar (SA); Syed Shujath Ali, Al-Dammam (SA); Hasan Kesserwan, Al-Khobar (SA); Guodong Jin, Katy, TX (US)

(72) Inventors: Salah Al-Ofi, Al-Khobar (SA); Bilal Saad, Al-Khobar (SA); Syed Shujath Ali, Al-Dammam (SA); Hasan Kesserwan, Al-Khobar (SA); Guodong Jin, Katy, TX (US)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 210 days.

(21) Appl. No.: 16/943,342

(22) Filed: Jul. 30, 2020

(65) Prior Publication Data

US 2022/0034222 A1 Feb. 3, 2022

(51) Int. Cl.
*E21B 49/00* (2006.01)
*E21B 44/00* (2006.01)
(Continued)

(52) U.S. Cl.
CPC .............. *E21B 49/00* (2013.01); *E21B 44/00* (2013.01); *G01V 1/303* (2013.01); *G01V 1/50* (2013.01); *G01V 3/34* (2013.01); *G01V 20/00* (2024.01)

(58) Field of Classification Search
CPC ...... E21B 49/00; E21B 44/00; E21B 2200/20; E21B 7/04; E21B 33/00; G01V 1/303;
(Continued)

(56) References Cited

U.S. PATENT DOCUMENTS 4,703,277 A * 10/1987 Kenyon ................. G01V 11/00
 324/338
8,005,619 B2 8/2011 Akbar
(Continued)

OTHER PUBLICATIONS

Kouchmeshky et al. "Using Dielectric Dispersion Logging to Calculate the Parameters of Archie's Law", 2016, The American Physical Society (Year: 2016).*

(Continued)

*Primary Examiner* — Rehana Perveen
*Assistant Examiner* — Troy A Maust
(74) *Attorney, Agent, or Firm* — CANTOR COLBURN LLP

(57) ABSTRACT

Examples described herein provide a computer-implemented method for deriving textural properties of a reservoir formation. The method includes acquiring multi-frequency dielectric data ($\varepsilon_{meas}$). The method further includes applying a dielectric mixing model between different fluid phases to generate an effective fluid permittivity ($\varepsilon_{fluid}$) by mixing the permittivity of water and hydrocarbon fluids. The method further includes applying the dielectric mixing model between the effective fluid permittivity ($\varepsilon_{fluid}$) and a matrix permittivity ($\varepsilon_m$). The method further includes minimizing a difference between a measured dielectric response and the dielectric mixing model by optimizing model parameters. The method further includes computing a cementation exponent (m) and a saturation exponent (n) from the multi-frequency dielectric data ($\varepsilon_{meas}$). The method further includes estimating a formation property based at least in part on the cementation exponent (m) and the saturation exponent (n). A wellbore operation is controlled based at least in part on the formation property.

16 Claims, 6 Drawing Sheets

(51) Int. Cl.

| | | |
|---|---|---|
| *G01V 1/30* | (2006.01) | |
| *G01V 1/50* | (2006.01) | |
| *G01V 3/34* | (2006.01) | |
| *G01V 20/00* | (2024.01) | |
| *G01V 99/00* | (2009.01) | |

(58) Field of Classification Search
CPC .......... G01V 1/50; G01V 3/34; G01V 99/005; G01V 3/30
USPC .......................................................... 703/10
See application file for complete search history.

(56) References Cited

U.S. PATENT DOCUMENTS

| | | | |
|---|---|---|---|
| 8,538,700 | B2 | 9/2013 | Badri et al. |
| 10,393,641 | B2 | 8/2019 | Donadille et al. |
| 2007/0061082 | A1 | 3/2007 | Seleznev et al. |
| 2008/0257546 | A1* | 10/2008 | Cresswell ............... E21B 47/04 166/250.15 |
| 2011/0284314 | A1* | 11/2011 | Oraby ....................... G01V 1/50 181/105 |
| 2016/0003963 | A1 | 1/2016 | Kouchmeshky et al. |
| 2016/0040531 | A1* | 2/2016 | Ramakrishnan ......... G01V 3/38 702/11 |
| 2016/0097876 | A1* | 4/2016 | Freed ....................... G01V 3/30 703/2 |
| 2017/0123104 | A1* | 5/2017 | Donadille .............. G01N 33/24 |
| 2017/0276832 | A1 | 9/2017 | Kouchmeshky et al. |
| 2018/0120468 | A1 | 5/2018 | Seleznev et al. |
| 2018/0164466 | A1 | 6/2018 | Zhang |
| 2018/0203151 | A1 | 7/2018 | Kochmeshky et al. |
| 2018/0347349 | A1* | 12/2018 | Marsala ................. E21B 47/024 |
| 2019/0204466 | A1 | 7/2019 | Zhang et al. |
| 2021/0157025 | A1* | 5/2021 | Seleznev .................. G01V 3/38 |

OTHER PUBLICATIONS

Stroud et al. "Analytical model for the dielectric response of brine-saturated rocks", 1986 (Year: 1986).*

Al-Ofi et al.; "Correlating Dielectric Dispersion Data and Wettability Index of a Carbonate Rock"; SPE-192224-MS; SPE International; Society of Petroleum Engineers; Aug. 23-26, 2018; 20 Pages.

Archie; "The Electrical Resistivity Log as an Aid in Determining Some Reservoir Characteristics"; Society of Petroleum Engineers; vol. 146, Issue 1; Dec. 1, 1942; 9 Pages.

Birchak et al.; "High Dielectric Constant Microwave Probes for Sensing Soil Moisture"; Proceedings of the IEEE; vol. 62, Issue 1; Jan. 1974; pp. 93-98.

Donaldson et al.; "Relationship Between the Archie Saturation Exponent and Wettability"; SPE Formation Evaluation; Society of Petroleum Engineers; vol. 4, Issue 3; Sep. 1989; pp. 359-362.

Elashahab et al.; "Resistivity Index and Capillary Pressure Hysteresis for Rock Samples of Different Wettability Characteristics"; SPE 29888; SPE International; Society of Petroleum Engineers; Mar. 11-14, 1995; pp. 519-529.

Forgang et al.; "A New Multi-Frequency Array-Dielectric Logging Service: Tool Physics, Field Testing, and Case Studies in the Permian Basin Wolfcamp Shale"; SPWLA 60th Annual Logging Symposium; Jun. 17-19, 2019; 21 Pages.

Haslund et al.; "Determination of Porosity and Formation Factor of Water-Saturated Porous Specimens from Dielectric Dispersion Measurements"; Geophysics; vol. 63, No. 1; Jan.-Feb. 1998; pp. 149-153.

Hizem et al. "Dielectric Dispersion: A New Wireline Petrophysical Measurement"; SPE 116130; SPE International; Society of Petroleum Engineers; Sep. 21-24, 2008; 21 Pages.

International Search Report Issued in International Application No. PCT/US2021/043275 dated Nov. 8, 2021; 6 Pages.

Klein et al.; "An Improved Model for the Dielectric Constant of Sea Water at Microwave Frequencies"; IEEE Journal of Oceanic Engineering; vol. 2, Issue 1; Jan. 1977; pp. 104-111.

Meissner et al.; "The Complex Dielectric Constant of Pure and Sea Water from Microwave Satellite Observations"; IEEE Transactions on Geoscience and Remote Sensing; vol. 42, Issue 9; Sep. 13, 2004; pp. 1836-1849.

Rabinovich et al.; "Challenges of Measuring Dielectric Anisotropy with High-Frequency Dielectric Logging Tools"; SPWLA 56th Annual Logging Symposium; Jul. 18-22, 2015; 10 Pages.

Seleznev et al.; "Formation Properties Derived from a Multi-Frequency Dielectric Measurement"; SPWLA 47th Annual Logging Symposium; Jun. 4-7, 2006; 12 Pages.

Sen; "Grain Shape Effects on Dielectric and Electrical Properties of Rocks"; Geophysics; vol. 49, No. 5; May 1984; pp. 586-587.

Stroud et al.; "Analytical Model for the Dielectric Response of Brine-Saturated Rocks"; Physical Review B: Condensed Matter and Materials Physics; vol. 34, No. 8; Nov. 1986; pp. 5145-5153.

Written Opinion Issued in International Application No. PCT/US2021/043275 dated Nov. 8, 2021; 5 Pages.

* cited by examiner

```
                                600
                                 ↓

┌─────────────────────────────────────────────────────────┐
    │  Acquire The Mulit-Frequency Dielectric Measurements At A │
    │    Plurality Of Frequencies Using A Plurality of         │
    │                    Transmitters                          │
    │                                                   602    │
    └─────────────────────────────────────────────────────────┘
                                 ↓
    ┌─────────────────────────────────────────────────────────┐
    │  Acquire The Acoustic Velocity Measurements By Transmitting │
    │  And Receiving Elastic Compressional Or Sheer Waves Inside │
    │                    A Formation                           │
    │                                                   604    │
    └─────────────────────────────────────────────────────────┘
                                 ↓
    ┌─────────────────────────────────────────────────────────┐
    │  Estimate A Cementation Exponent (m) From The Acoustic   │
    │  Velocity Measurements For A Partially Saturated Formation │
    │                     At A Depth                           │
    │                                                   606    │
    └─────────────────────────────────────────────────────────┘
                                 ↓
    ┌─────────────────────────────────────────────────────────┐
    │  Estimate A Saturation Exponent (n) Using The Cementation │
    │     Exponent (m) Based At Least In Part On The           │
    │  Multi-Frequency Dielectric Measurements Corresponding   │
    │    To The Depth And A Dielectric Mixing Model            │
    │                                                   608    │
    └─────────────────────────────────────────────────────────┘
                                 ↓
    ┌─────────────────────────────────────────────────────────┐
    │  Estimate A Formation Property Based At Least In Part    │
    │   On The Cementation Exponent (m) And The                │
    │           Saturation Exponent (n)                        │
    │                                                   610    │
    └─────────────────────────────────────────────────────────┘
                                 ↓
    ┌─────────────────────────────────────────────────────────┐
    │  Control A Wellbore Operation Based At Least In Part     │
    │           On The Formation Property                      │
    │                                                   612    │
    └─────────────────────────────────────────────────────────┘
```

FIG.6

DETERMINE A FORMATION'S TEXTURAL PARAMETERS USING ADVANCING LOGGING DATA

BACKGROUND

Embodiments described herein relate generally to downhole exploration and production efforts in the resource recovery industry and more particularly to techniques for determining formation's textural parameters using advancing logging data.

Downhole exploration and production efforts involve the deployment of a variety of sensors and tools. The sensors provide information about the downhole environment, for example, by collecting data about temperature, density, saturation, and resistivity, among many other parameters. This information can be used to control aspects of drilling and tools or systems located in the bottom hole assembly, along the drillstring, or on the surface.

SUMMARY

Embodiments of the present invention are directed to determining formation's textural parameters using advancing logging data.

A non-limiting example method for deriving textural properties of a reservoir formation includes acquiring multi-frequency dielectric data ($\varepsilon_{meas}$) The method further includes applying a dielectric mixing model between different fluid phases to generate an effective fluid permittivity ($\varepsilon_{fluid}$) by mixing the permittivity of water and hydrocarbon fluids. The method further includes applying the dielectric mixing model between the effective fluid permittivity ($\varepsilon_{fluid}$) and a matrix permittivity ($\varepsilon_m$). The method further includes minimizing a difference between a measured dielectric response and the dielectric mixing model by optimizing model parameters. The method further includes computing a cementation exponent (m) and a saturation exponent (n) from the multi-frequency dielectric data ($\varepsilon_{meas}$) The method further includes estimating a formation property based at least in part on the cementation exponent (m) and the saturation exponent (n). The method further includes controlling a wellbore operation based at least in part on the formation property.

A non-limiting example method for evaluating petrophysical textural parameters based on acoustic velocity measurements and multi-frequency dielectric logging measurements includes acquiring the multi-frequency dielectric measurements at a plurality of frequencies using a plurality of transmitters. The method further includes acquiring the acoustic velocity measurements by transmitting and receiving elastic compressional or shear waves inside a formation. The method further includes estimating a cementation exponent (m) from the acoustic velocity measurements for a partially saturated formation at a depth. The method further includes estimating a saturation exponent (n) using the cementation exponent (m) based at least in part on the multi-frequency dielectric measurements corresponding to the depth and a dielectric mixing model. The method further includes estimating a formation property based at least in part on the cementation exponent (m) and the saturation exponent (n). The method further includes controlling a wellbore operation based at least in part on the formation property.

Other embodiments of the present invention implement features of the above-described method in computer systems and/or computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

Referring now to the drawings wherein like elements are numbered alike in the several figures:

FIG. 6 depicts a flow diagram of a method for evaluating petrophysical textural parameters based on acoustic velocity measurements and multi-frequency dielectric logging measurements according to one or more embodiments described herein.

DETAILED DESCRIPTION

Modern bottom hole assemblies (BHAs) are composed of several distributed components, such as sensors and tools, with each component performing data acquisition and/or processing of a special purpose. Some BHAs, such as those used in wireline logging operations and logging while drilling (LWD) operations, provide for fluid analysis sampling and testing to obtain formation pressure and formation fluid samples while drilling.

Figure 1:
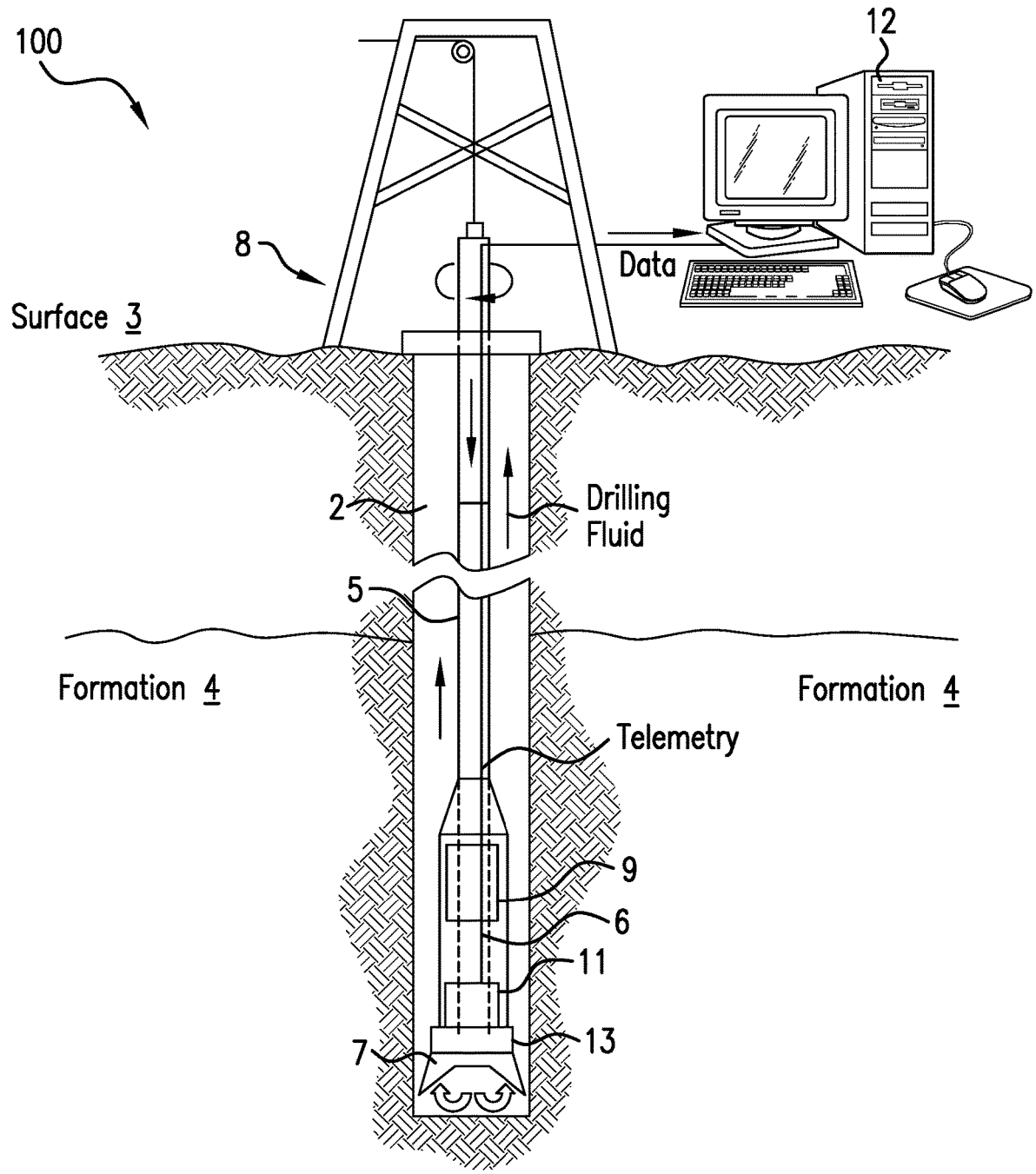
FIG. 1 depicts a cross-sectional view of a wellbore operation according to one or more embodiments described herein.

Wellbores are drilled into a subsurface to produce hydrocarbons and for other purposes. In particular, FIG. 1 depicts a cross-sectional view of a wellbore system 100, according to aspects of the present disclosure. In traditional wellbore operations, wireline logging, LWD, or measurement-while-drilling (MWD) measurements are conducted during a drilling operation to determine formation rock and fluid properties of a formation 4. Those properties are then used for various purposes such as controlling and steering the drilling of the borehole 2, estimating reserves from saturation logs, defining completion setups, etc. as described herein.

The system and arrangement shown in FIG. 1 is one example to illustrate the downhole environment. While the system can operate in any subsurface environment, FIG. 1 shows a carrier 5 disposed in a borehole 2 penetrating the formation 4. A drill bit 7 is disposed in the borehole 2 at a distal end of the borehole 2, as shown in FIG. 1.

As shown in FIG. 1, the carrier 5 is a drill string that includes a BHA 13. The BHA 13 is a part of the drilling rig 8 (also referred to as a "drilling assembly") and may include drill collars, stabilizers, reamers, motors, turbines, and the like, and the drill bit 7. In examples, the drill bit 7 is disposed at a forward end of the BHA 13. The BHA 13 also includes sensors (e.g., measurement tools 11) and electronic components (e.g., downhole electronic components 9). The measurements collected by the measurement tools 11 can include measurements related to drill string operations, for example. A drilling rig 8 is configured to conduct drilling operations such as rotating the drill string and, thus, the drill bit 7. The drilling rig 8 also pumps drilling fluid through the drill string in order to lubricate the drill bit 7 and flush cuttings from the borehole 2. The measurement tools 11 and downhole electronic components 9 are configured to perform one or more types of measurements in an embodiment known as wireline logging, LWD or MWD according to one or more embodiments described herein. This can include, for example, fluid sampling operations.

Data is collected by the measurement tools 11 and transmitted to the downhole electronic components 9 for processing. The data can be communicated between the measurement tools 11 and the downhole electronic components 9 by a wire 6, such as a power line, which transmits power and data between the measurement tools 11 and the downhole electronic components 9, and/or by a wireless link (not shown) between the measurement tools 11 and the downhole electronic components 9. Power is generated downhole by a turbine-generation combination (not shown), and communication to the surface 3 (e.g., to a processing system 12) is cable-less (e.g., using mud pulse telemetry, electromagnetic telemetry, etc.) and/or cable-bound (e.g., using a cable to the processing system 12). The data processed by the downhole electronic components 9 can then be telemetered to the surface 3 via the wire 6, for example, by a telemetry system like a mud pulser, utilizing fluid pressure variations, or by an electromagnetic telemetry system utilizing electromagnetic waves, with telemetry techniques for additional processing or display by the processing system 12.

Drilling control signals can be generated by the processing system 12 (e.g., based on the raw data collected by the measurement tools 11) and conveyed downhole or can be generated within the downhole electronic components 9 or by a combination of the two according to embodiments of the present disclosure. The downhole electronic components 9 and the processing system 12 can each include one or more processors and one or more memory devices. In alternate embodiments, computing resources such as the downhole electronic components 9, sensors, and other tools can be located along the carrier 5 rather than being located in the BHA 13, for example. The borehole 2 can be vertical as shown or can be in other orientations/arrangements (see, e.g., FIG. 3).

Figure 2:
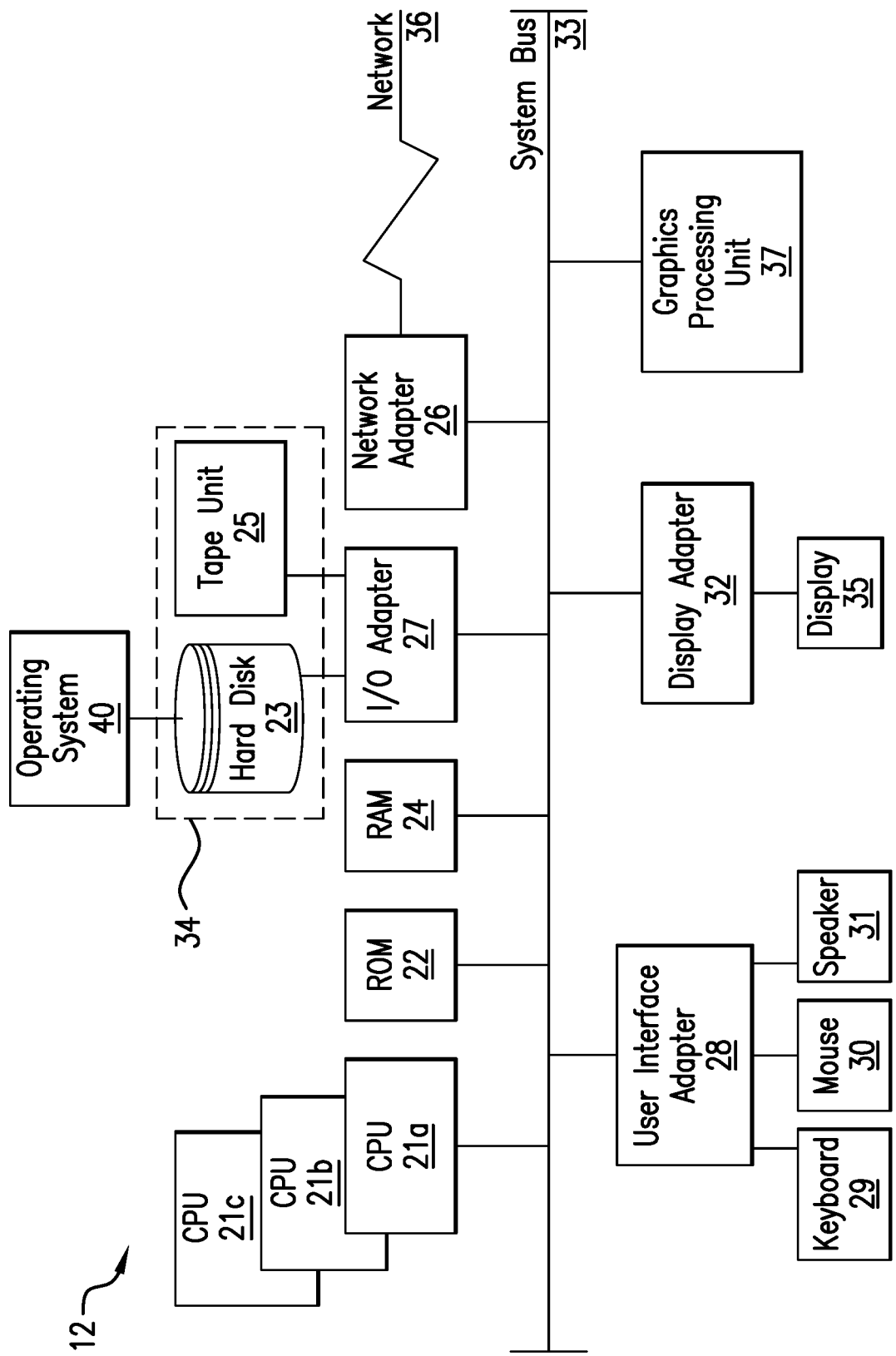
FIG. 2 depicts a block diagram of the processing system of FIG. 1, which can be used for implementing the present techniques herein according to one or more embodiments described herein.

It is understood that embodiments of the present disclosure are capable of being implemented in conjunction with any other suitable type of computing environment now known or later developed. For example, FIG. 2 depicts a block diagram of the processing system 12 of FIG. 1, which can be used for implementing the techniques described herein. In examples, processing system 12 has one or more central processing units 21a, 21b, 21c, etc. (collectively or generically referred to as processor(s) and/or as processing device(s)). In aspects of the present disclosure, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 12.

Further illustrated are an input/output (I/O) adapter 27 and a network adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on the processing system 12 can be stored in mass storage 34. The network adapter 26 interconnects system bus 33 with an outside network 36 enabling processing system 12 to communicate with other such systems.

A display (e.g., a display monitor) 35 is connected to system bus 33 by display adapter 32, which can include a graphics adapter to improve the performance of graphics intensive applications and a video controller. In one aspect of the present disclosure, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

In some aspects of the present disclosure, processing system 12 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 12 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in processing system 12.

According to examples described herein, techniques are provided for determining parameters of a formation using multi-frequency dielectric data. According to other examples described herein, techniques are provided for determining parameters of a formation using acoustic velocity and multi-frequency dielectric data.

Estimating oil reserves in a reservoir is an important and tedious task for petroleum engineers particularly for heterogeneous reservoirs as in clastic and carbonate formations. Such task requires knowledge of the formation, saturating fluids properties and application of a representative model to extract fluids saturation from downhole measurements.

An electrical induction tool is an example of a wireline logging tool that is commonly used downhole due to its sensitivity to the conducting brine and its resistivity contrast with the highly resistive hydrocarbon phase in porous layers. Another reason of using an electrical induction tool is its long depth of investigation, which reaches the uninvaded zone, which is the more representative zone to a reservoir properties. This is in contrast to other tools such as NMR or dielectric or acoustic tools, which measure the flushed zone, which is affected by drilling fluid invasion.

Reservoir fluids saturation are commonly estimated using the principle of electrical conduction current running through electrolytic water solution and its disturbance due to presence of insulating solid grains and hydrocarbons. A mathematical relation has been defined, referred to as the Archie Equation or Archie Relationship, between formation resistivity ($R_t$) and water saturation ($S_w$) based on core measurements. This mathematical formulation has been historically used to estimate oil reserves. The Archie Relationship depends on other parameters such as; saturating brine resistivity ($R_w$), total porosity (Ø), cementation exponent (m) and saturation exponent (n) which have either been assumed or determined from laboratory core measurements which are expensive and time consuming. Having a non-representative or inaccurate Archie's exponents, m and n, can lead to erroneous reservoir fluids saturation. Also, the total porosity (Ø) is typically obtained from another independent measurement such as neutron and density logs.

Another conventional electrical logging technique for fluids saturation determination is based on formation dielectric property at radio frequency (RF). Such technique relies on the polarization of water molecules and tortuosity. The main advantage of this technique is the ability to predict water saturation without the knowledge of brine and textural properties. Nevertheless, there are quiet some effective theory models that can predict some textural information from multi-frequency dielectric property variation. However, the commercial logging tools of such technique can measure only the invaded zone from the borehole, and its accuracy to predict oil saturation at the non-invaded zone is questionable.

There are several existing approaches that can estimate Archie's exponents from downhole measurements as follows:

- An approach that links several wells or different depth of investigation resistivity measurement on similar rock types calculates the Archie's exponents.
- Another approach determines cementation exponent (m) from resistivity borehole images based on porosity heterogeneity transformation. Such approach may infer cementation exponent of borehole wall depth dependent by aid of core measurement in the laboratory.
- Another approach to estimate m and n of a formation is to assume both are equal and invert multi-frequency dielectric logging data. Different mixing interpretation models are utilized to extrapolate high frequency dielectric measurement to zero frequency (DC).
- Another approach to estimate m and n of a formation using multi-sensors dielectric logs at different depths with varying water saturation levels assumes those depths of investigations has similar rock type.
- Another approach computes m and n from a system of equations constructed from solving the variation of formation's conductivity with respect to porosity and saturation. Such approach can derive both exponents from dielectric dispersion data using any mixing model.
- Another approach estimates m and n of a formation using multi-sensors dielectric logs at different depths of investigations with varying water saturation levels. This approach assumes those depths of investigations has similar rock type.
- Another approach establishes a metric that normalizes the water saturation influence on dielectric dispersion data and correlate it to water phase tortuosity derived from the assumption of m=n and collect several measurements having similar rock type or pore structure to estimate m and n from the two extremes of the established normalization metric.

These conventional approaches have various drawbacks, making them unsuitable for deriving textural properties of a reservoir formation using the techniques described herein. For example, the previously mentioned conventional approaches rely on assumptions related to saturation variation or constant formation pore structure or rock type which is not always feasible or precisely estimated downhole.

The present techniques address these shortcomings of the prior art by utilizing an independent method to establish information about Archie's exponents. Further, such approach is not very sensitive to saturation variation such as acoustic velocity, and if integrated to multi-frequency dielectric measurements, one can confidently establish information about the saturation exponent n with less dependency on saturation level of the formation which we are looking for at the end.

Several other existing approaches are known to show how cementation exponent can be estimated from acoustic velocities. For example, it has been demonstrated how resistivity and acoustic measurements can be coupled to solve for the spherical pores connectivity using spherical pores model and derive more accurate expression for cementation exponent m. It has also been shown that a good correlation exists between Archie's formation factor and compressional velocity from a large number of cores taken from a heterogeneous complex reservoir in Canada. Such finding can be used to estimate m from the established correlation when formation porosity is known from an independent logging data.

According to one or more embodiments described herein, a mathematical model and method to derive textural properties of a reservoir formation are provided. These textural properties are related directly to Archie's exponents: cementation exponent (m) and saturation exponent (n). Embodiments described herein utilize multi-frequency dielectric data acquired from a porous formation at partial water saturation condition. The developed model applies already established mixing models on two different interfaces: oil-water interface and fluid-matrix interface. The polarization of oil-water interface can be related to saturation exponent (n), and fluid-matrix interface can be related to cementation exponent (m). Embodiments described herein employ a set of multi-frequency dielectric (permittivity) logging data of near wellbore to estimate formation properties described by Archie's cementation and saturation exponents, m and n. Further, a workflow and mathematical expressions are provided to evaluate these exponents reliably without unrealistic assumptions and reduced dependency on pore space fluids properties or rock type. This approach is now described with reference to FIGS. 3, 4, and 5.

In one aspect, multi-frequency dielectric data of near well-bore are used to estimate simultaneously formation's petrophysical parameters including: fluids saturation, cementation exponent m and saturation exponent n for any partially saturated formation at any particular depth. This process requires fitting the multi-frequency dielectric data with the said model.

In one aspect, a mixing model from the ones available in literature is used to compute the effective fluid permittivity of the fluids mixture; water/oil or water/gas. The said model describes the fluids volume proposition and the nature of the geometrical interfaces between different fluids. The same or different mixing model can be applied to compute the effective permittivity of the matrix phase and fluids mixture phase which the later permittivity was determined from the effective fluid permittivity.

In one aspect, an empirical correlation can be derived from laboratory core data to calibrate cementation exponent m and saturation exponent n with the ones computed from the said model.

In one aspect, formation properties derived from multi-frequency dielectric measurements at water bearing zones and determine a metric which is related to Archie's cementation exponent m. Similar workflow can be also done using cores data based on fully and partially saturated with water and utilize the resulting correlation in downhole to derive cementation exponent m and saturation exponent n respectively from multi-frequency dielectric measurements.

The presented method (see, e.g., the method 400 of FIG. 4 and/or the method 500 of FIG. 5) employs a set of multi-frequency dielectric (permittivity) logging data of near wellbore to estimate formation properties described by Archie's cementation and saturation exponents, m and n. It describes a workflow and mathematical expressions to evaluate these exponents reliably without unrealistic assumptions and reduced dependency on pore space fluids properties or rock type.

In one embodiment, multi-frequency dielectric data of near wellbore are used to estimate simultaneously formation's petrophysical parameters including: fluids saturation, cementation exponent m and saturation exponent n for any partially saturated formation at any particular depth. This process fits the multi-frequency dielectric data with the model.

In one aspect, a mixing model from the ones available in literature is used to compute the effective fluid permittivity of the fluids mixture: water/oil or water/gas. The model describes the fluids volume proposition and the nature of the geometrical interfaces between different fluids. The same or different mixing model can be applied to compute the effective permittivity of the matrix phase and fluids mixture phase which the later permittivity was determined from the effective fluid permittivity.

In one aspect, an empirical correlation can be derived from laboratory core data to calibrate the cementation exponent m and the saturation exponent n with the ones computed from the said model.

In one aspect, formation properties derived from multi-frequency dielectric measurements at water bearing zones are used to determine a metric which is related to Archie's cementation exponent m. A similar workflow can be also done using cores data fully saturated with water and utilize the resulting correlation in downhole to derive saturation exponent n from multi-frequency dielectric measurements.

Knowledge of fluids saturation from electrical resistivity measurement in porous media is govern typically by applying Archie's Equation. Such equation relates a formation resistivity ($R_t$) to saturating brine resistivity ($R_w$), porosity (Ø) and water saturation ($S_w$) with some exponents; cementation exponent (m) and saturation exponent (n) as follows in Equation 1:

$$R_w/R_t = S_w^n \varnothing^m. \quad (1)$$

Conventionally, Archie's exponents m and n are either assumed to be a constant value or are determined from laboratory core measurements which are expensive, time-consuming, and limited to selected depths. The exponent m reflects information about rock texture such as grain shape or size distribution and how they are compacted, whereas the saturation exponent n reflects how the water-phase is distributed inside the pore space and the wetting condition of the grains. The total porosity (Ø) is typically obtained from another independent measurement such as neutron and density data.

The dielectric constant or permittivity of a medium is defined as the amount of energy stored or dissipated per unit volume as electrical field passes through it and expressed as a complex number ($\varepsilon^*$) as follows in Equation 2:

$$\varepsilon^* = \varepsilon_{\mathit{eff}} = \varepsilon'_r(\omega) + i\varepsilon''_r(\omega) = \varepsilon'_r(\omega) + i\frac{\sigma(\omega)}{\omega\varepsilon_0} \quad (2)$$

where $\varepsilon_r'$ is the real dielectric constant, $\varepsilon_r''$ is the imaginary dielectric constant, $\omega$ is the angular frequency in (rad/second), $\sigma$ is the conductivity in (Siemens/m), and $\varepsilon_0$ is the free-space dielectric constant which is 8.854×10-12 (Farads/m2). The dielectric constant is a function of frequency where at few MHz frequency range is dominated by interfacial polarization which occurs between any interface with a contrast in permittivity such as between solid grains and fluid, and where at few GHz frequency range the orientational polarization is dominating and occurs at molecular scale.

Dielectric measurement at plurality of frequencies between 10 MHz and 1 GHz, for example, can be obtained by using a group of transmitters and receivers that fire and receive electromagnetic waves inside the formation. Deriving formation petrophysical properties from dielectric dispersion data depends on the polarization mechanism occurring in the water-phase inside a porous media. The dominant polarization mechanism is the interfacial polarization which occurs at the interfaces of the water-phase. These interfaces can be modelled as water/oil interface and fluid/matrix interface (see FIG. 3). The polarization of both interfaces can be integrated in one mixing model (e.g., the developed model 314 of FIG. 3) to compute an effective permittivity.

Several mixing models can be used to compute the effective permittivity from a mixture of different constitutes. The effective permittivity observed for porous media, partially filled with water and hydrocarbon, can generally take the following general form as follows in Equation 3:

$$\varepsilon_{\mathit{eff}} = \psi(\varnothing, S_w, \varepsilon_w, \varepsilon_m, \varepsilon_{HC}, \lambda_w, \lambda_{HC}, \lambda_m) \quad (3)$$

where $\psi$ could be any mixing model, $\varepsilon_{\mathit{eff}}$ is the effective dielectric constant of the mixture, $\varepsilon_w$ is the permittivity of water which can be determined using different models, $\varepsilon_{HC}$ is the permittivity of hydrocarbon, $\varepsilon_m$ is the solid matrix or grains permittivity, Ø is the porosity of the medium and $S_w$ is the water saturation, $\lambda_w$ is a textural parameter related to water phase, $\lambda_{HC}$ is a textural parameter related to hydrocarbon phase and $\lambda_m$ is a textural parameter related to matrix.

According to one or more embodiments described herein, Equation 3 is broken down into two dependent equations, referred to as mixing models, where the first equation (Equation 4) describing the water/oil polarization is super imposed in the second equation (Equation 5) which describes the fluid/matrix polarization. A general expression of the proposed model takes the following form, represented by Equations 4 and 5:

$$\varepsilon_{\mathit{fluid}} = \psi(S_w, \varepsilon_w, \varepsilon_{HC}, \lambda_w, \lambda_{HC}) \quad (4)$$

$$\varepsilon_{\mathit{eff}} = \psi(\varnothing, \varepsilon_{\mathit{fluid}}, \varepsilon_m, \lambda_{\mathit{fluid}}, \lambda_m) \quad (5)$$

where $\varepsilon_{\mathit{fluid}}$ is the effective permittivity resulted from mixing water and hydrocarbon phases and $\lambda_{\mathit{fluid}}$ is a textural parameter of the fluid mixture phase and related to both $\lambda_w$ and $\lambda_{HC}$. A simple form of $\lambda_{fluid}$ can be $\lambda_{fluid}=\lambda_w=\lambda_{HC}$ which is pursued hereafter. Equations 4 and 5 are solved (e.g., simultaneously) to fit multi-frequency dielectric data of a particular formation which is going to be demonstrated as follows.

The mixing model $\psi$ can take any form and the approach described herein is not intended to be limited to a particular mixing model. An example of a mixing model is Complex Refractive Index Model (CRIM), which computes the effective permittivity ($\varepsilon_{eff}$) of a mixture of different constitutes with known individual's permittivity and volume proposition. For a porous media partially saturated by water and oil, the CRIM model is expressed as shown in Equation 6:

$$\sqrt{\varepsilon_{eff}}=\emptyset S_w\sqrt{\varepsilon_w}+\emptyset(1-S_w)\sqrt{\varepsilon_{oil}}+(1-\emptyset)\sqrt{\varepsilon_m} \quad (6)$$

where $\varepsilon_{eff}$ is the effective dielectric constant of the mixture, $\varepsilon_w$ is the permittivity of water which can be determined using different models, $\varepsilon_{oil}$ is the permittivity of oil, $\varepsilon_m$ is the solid matrix or grains permittivity, $\emptyset$ is the porosity of the medium and $S_w$ is the water saturation.

Another form of Equation 3 is used and referred to a generalized CRIM expression as follows:

$$\varepsilon_{eff}^w=\emptyset S_w\varepsilon_w^w+\emptyset(1-S_w)\varepsilon_{oil}^w+(1-\emptyset)\varepsilon_m^w \quad (7)$$

where w is a general exponent relates to formation texture, or simply $w=\lambda_w=\lambda_{HC}=\lambda_m$. If w equals to 0.5, Equation 7 takes the form of the common CRIM expression as in Equation 6.

Another model can be considered for that also capture information about the geometry of the constitutes as in (Stroud, Milton and De 1986) as follows as expressed by Equation 8:

$$\varepsilon_{eff}=\emptyset_w^{m^*}\varepsilon_w+(1-\emptyset_w^{m^*})\varepsilon_m-\varepsilon_m h(s) \quad (8)$$

where m* is the apparent Archie's law cementation exponent (for simplicity it can be assumed to be $m^*=\lambda_w=\lambda_{HC}=\lambda_m$), s is equal to $\varepsilon_m/(\varepsilon_w-\varepsilon_m)$ and h(s) can be evaluated numerically.

In fully brine saturated medium, apparent cementation exponent m* is equivalent to Archie's cementation exponent m. It is possible to probe such formation by comparing total porosity from neutron density logging data and water-filled porosity from dielectric data using either Equation 7 or Equation 8 or any other dielectric mixing model. Such condition could be feasible in water-bearing intervals.

According to one or more embodiments described herein, the dielectric effect of water and the dielectric effect of hydrocarbon are combined following the workflow proposed in Equations 4 and 5 using mixing models as an example but not limited to Equations 7 and/or 8 to form $\varepsilon_{fluid}$ as the following:

$$\varepsilon_{fluid}^{w1}=S_w\varepsilon_w^{w1}+(1-S_w)\varepsilon_{oil}^{w1} \quad (9)$$

$$\varepsilon_{fluid}=S_w^{w1}\varepsilon_w+(1-S_w^{w1})\varepsilon_{oil}-\varepsilon_{oil}h(s_{fluid}) \quad (10)$$

where $\varepsilon_{fluid}$ is the effective permittivity of mixing water and hydrocarbon fluids, w1 is a textural parameter related to fluids distribution in formation's pore space and $s_{fluid}$ is equal to $\varepsilon_{oil}/(\varepsilon_w-\varepsilon_{oil})$. w1 here is considered for simplicity equals $\lambda_{fluid}$, but generally it's function of $\lambda_{fluid}$ that requires core data calibration.

The second step of the workflow is to combine the resulted effective fluids permittivity $\varepsilon_{fluid}$ with the matrix permittivity in similar manner to form $\varepsilon_{eff}$ as follows:

$$\varepsilon_{eff}^{w2}=\emptyset\varepsilon_{fluid}^{w2}+(1-\emptyset)\varepsilon_m^{w2} \quad (11)$$

$$\varepsilon_{eff}=\emptyset^{w2}\varepsilon_{fluid}+(1-\emptyset^{w2})\varepsilon_m-\varepsilon_m h(s_m) \quad (12)$$

where $\varepsilon_{eff}$ is the effective permittivity of mixing effective fluid and matrix, w2 is a textural parameter related to pore system cementation and $s_m$ is equal to $\varepsilon_m/(\varepsilon_{fluid}-\varepsilon_m)$. w2 here is considered for simplicity equals $\lambda_m$, but generally it is a function of $\lambda_m$ that utilizes core data calibration.

Figure 3:
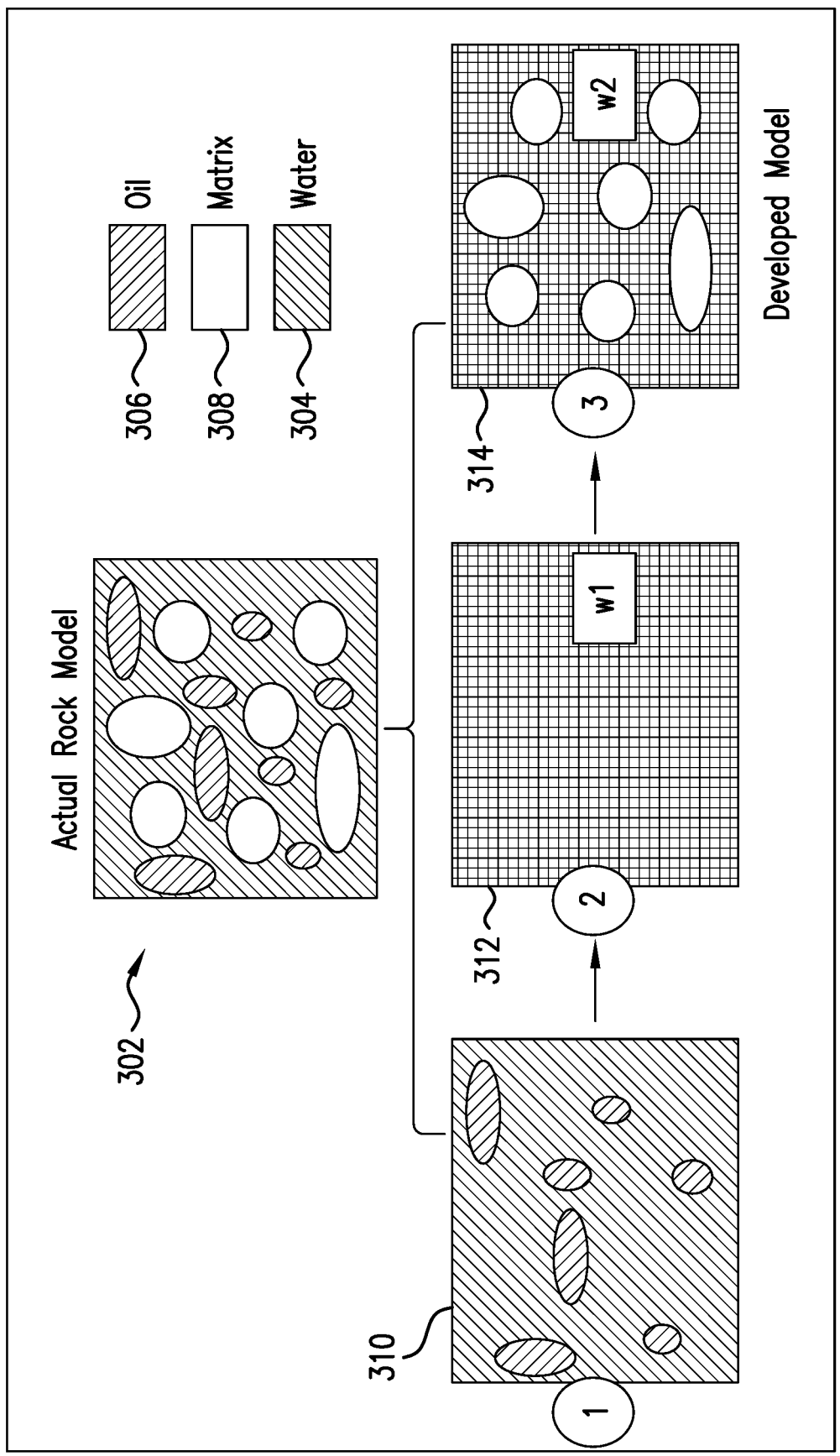
FIG. 3 shows symbolic constitutes of water, oil, and matrix presenting an actual rock model and the build-up of a developed model according to one or more embodiments described herein.

A simple diagram explains this workflow is illustrated in FIG. 3 according to one or more embodiments described herein. In particular, FIG. 3 shows symbolic constitutes of water 304, oil 306, and matrix 308 presenting an actual rock model 302 and the build-up of a developed model 314 where w1 represents a textural parameter for water/oil interfaces and w2 represents a textural parameter for fluids/matrix interfaces.

As will be further described herein, an oil/water layer 310 is transformed into layer 312 by applying a dielectric mixing model between different fluid phases. The layer 312 is then transformed into the developed model layer 314 by applying a dielectric mixing model between effective fluid-mixture permittivity and matrix permittivity.

Equations 9 and 11 can be combined in some examples or equations 10 and 12 can be combined in other examples to get an explicit form of formation permittivity as follows, represented by Equations 13 and 14.

$$\varepsilon_{eff}^{w2}=\emptyset[S_w\varepsilon_w^{w1}+(1-S_w)\varepsilon_{oil}^{w1}]^{w2/w1}+(1-\emptyset)\varepsilon_m^{w2} \quad (13)$$

$$\varepsilon_{eff}= \quad (14)$$
$$\emptyset^{w2}[S_w^{w1}\varepsilon_w+(1-S_w^{w1})\varepsilon_{oil}-\varepsilon_{oil}h(s_{fluid})]+(1-\emptyset^{w2})\varepsilon_m-\varepsilon_m h(s_m)$$

where $\xi=(w1, w2, S_w)$ are the main unknowns to be solved for using Equation 13 to match measured multi-frequency dielectric data with at least three different frequency dielectric data. Whereas for Equation 14, at least five different frequency dielectric data are used to solve for $\xi=(w1, w2, S_w, h(s_{fluid}), h(s_m))$. Matching the measured multi-frequency dielectric data and said model can be accomplished by finding the solution parameters set for minimizing the following function ($f(\xi)$) shown in Equation 15:

$$f(\xi)=\sqrt{\varepsilon_{eff}^2-\varepsilon_{meas}^2} \quad (15)$$

Where $\varepsilon_{eff}$ is reconstructed multi-frequency permittivity using the derived exemplary equation, Equations 13 or 14, $\varepsilon_{meas}$ is the acquired multi frequency permittivity measured from the formation.

A form of Archie's equation as in Equation 1 can then be derived from either Equation 13 or Equation 14 by taking the zero frequency limit of the imaginary part of $\varepsilon_{eff}$. Thus, Archie's saturation exponent can be related to 1/w1 and Archie's cementation exponent can be related to 1/w2.

Such relations can be validated using core laboratory procedure to derive accurate m and n. Calibrating the saturation exponent n with the solved parameter w1 from the model described herein uses core resistivity measurements at several water saturation conditions. In such cases, the core data is taken from a core with a similar formation and texture as the one measured downhole. However, calibrating the cementation exponent m can be achieved by either utilizing multi-frequency dielectric data from water-bearing zone or measuring core resistivity at fully water saturation condition. In such cases, the core measurements are taken from a core with a similar formation and texture as the one measured downhole.

Figure 4:
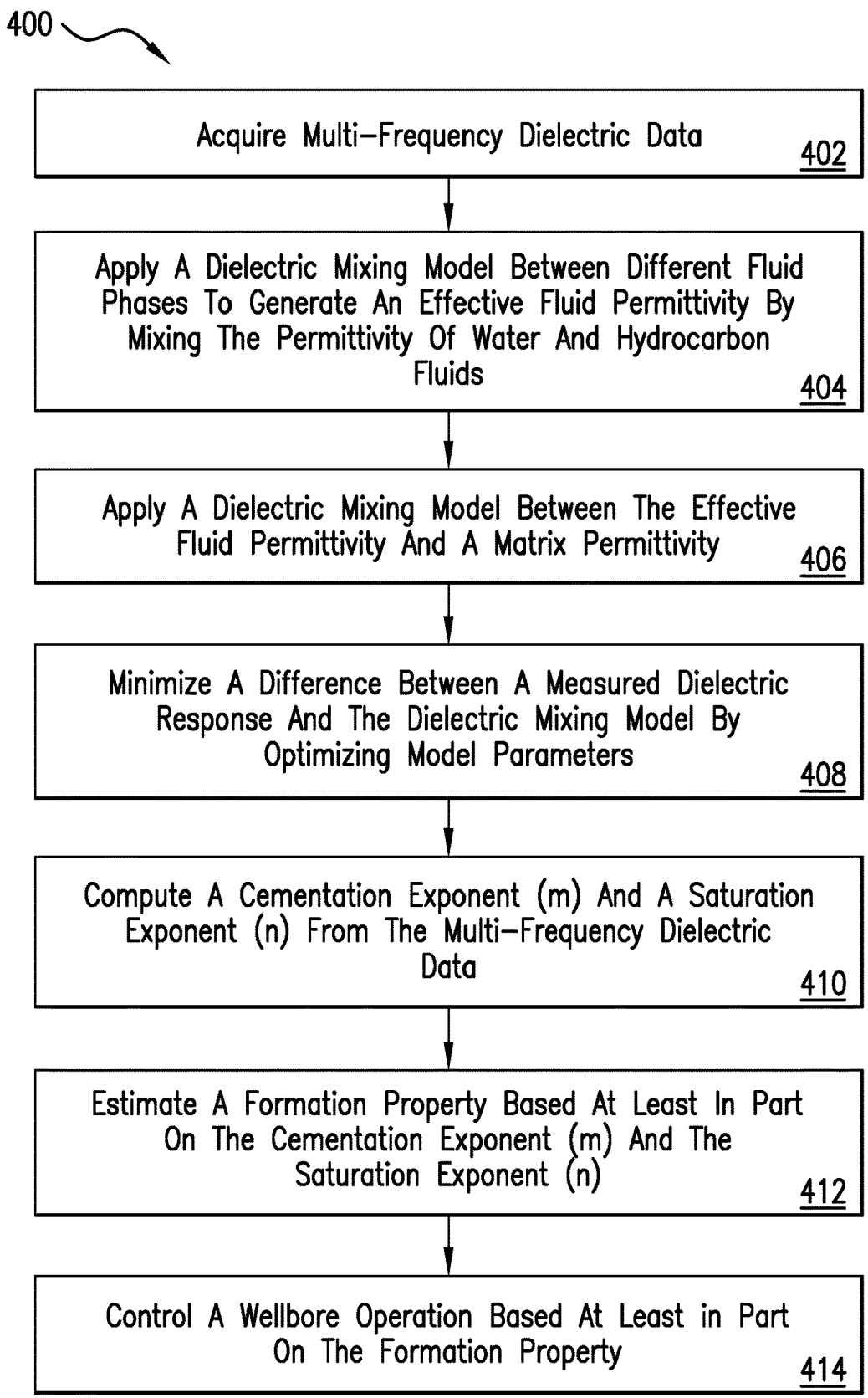
FIG. 4 depicts a flow diagram of a method for deriving textural properties of a reservoir formation according to one or more embodiments described herein.

FIG. 4 depicts a flow diagram of a method 400 for deriving textural properties of a reservoir formation according to one or more embodiments described herein. The method 400 can be performed by any suitable processing device or processing system, such as the processing system 12 of FIGS. 1 and 2.

At block 402, multi-frequency dielectric data ($\varepsilon_{meas}$) is acquired. At block 404, a dielectric mixing model is applied between different fluid phases to generate an effective fluid permittivity ($\varepsilon_{fluid}$) (see Equation 4) by mixing the permittivity of water and hydrocarbon fluids. At block 406, a dielectric mixing model is applied between the effective fluid permittivity ($\varepsilon_{fluid}$) and a matrix permittivity ($\varepsilon_m$) (see Equations 11 and 12). At block 408, a difference between a measured dielectric response and the dielectric mixing model is minimized by optimizing model parameters (see Equation 15). At block 410, a cementation exponent (m) and a saturation exponent (n) are computed from the multi-frequency dielectric data ($\varepsilon_{meas}$) (see Equations 13 or 14). At block 412, a formation property is estimated based at least in part on the cementation exponent (m) and the saturation exponent (n). At block 414, a wellbore operation (e.g., a production operation, a completion operation, etc.) is controlled based at least in part on the formation property. For example, an autonomous drilling system can be used to autonomously control a drilling rig based at least in part on the formation property.

Additional processes also may be included, and it should be understood that the process depicted in FIG. 4 represents an illustration, and that other processes may be added or existing processes may be removed, modified, or rearranged without departing from the scope of the present disclosure.

Figure 5:
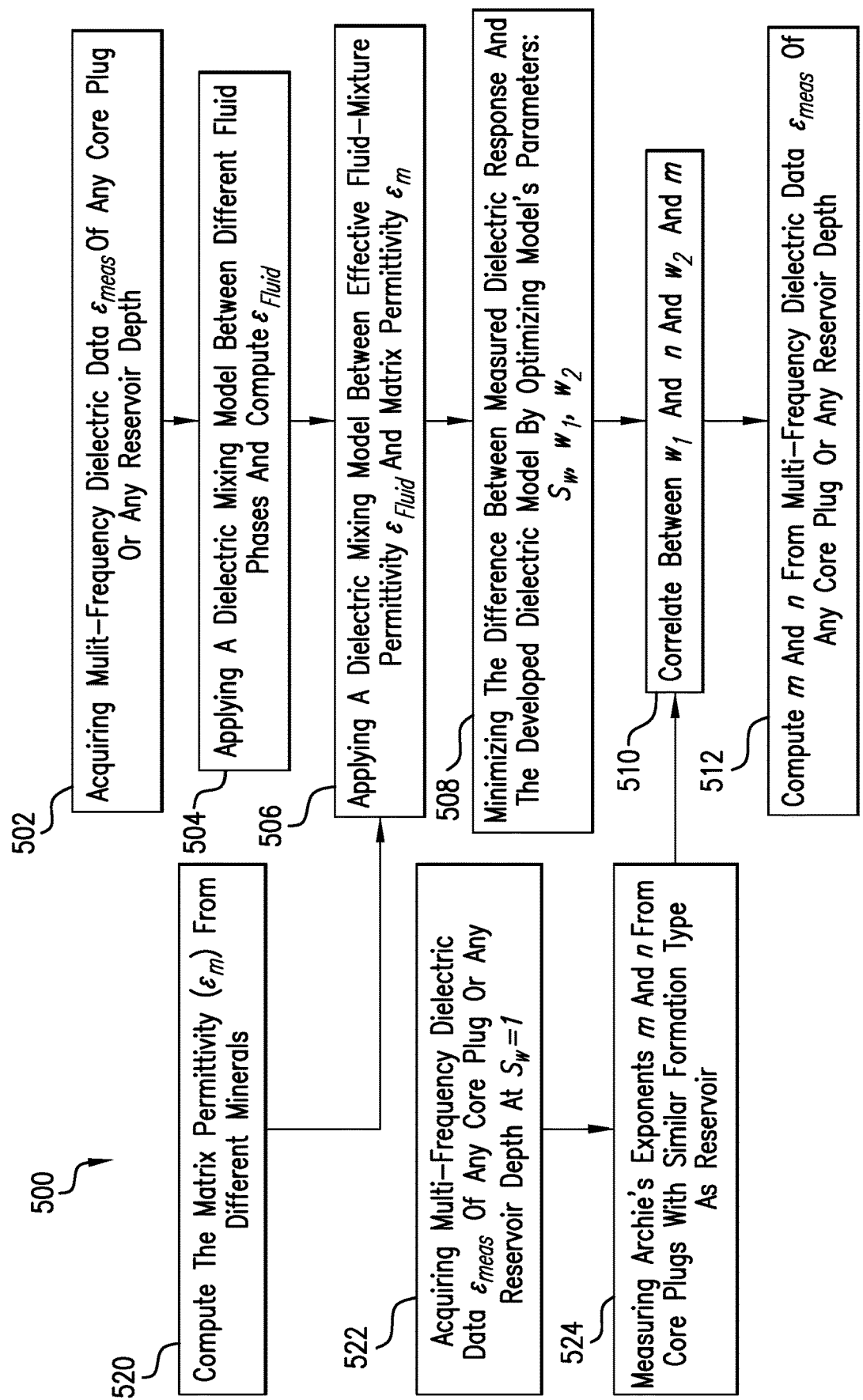
FIG. 5 depicts a flow diagram of a method for a workflow deriving textural properties of a reservoir formation according to one or more embodiments described herein.

FIG. 5 depicts a flow diagram of a method 500 for a workflow deriving textural properties of a reservoir formation according to one or more embodiments described herein. The method 500 can be performed by any suitable processing device or processing system, such as the processing system 12 of FIGS. 1 and 2.

At block 502, multi-frequency dielectric data ($\varepsilon_{meas}$) is acquired. At block 504, a dielectric mixing model is applied between different fluid phases to generate (i.e., compute) an effective fluid permittivity ($\varepsilon_{fluid}$) (see Equation 4) of mixing water and hydrocarbon fluids.

At block 506, a dielectric mixing model is applied between the effective fluid permittivity ($\varepsilon_{fluid}$) and a matrix permittivity ($\varepsilon_m$) (see Equations 11 and 12). The matrix permittivity ($\varepsilon_m$) can be computed from different minerals at block 520.

At block 510, a difference between a measured dielectric response and the dielectric mixing model is minimized by optimizing model parameters (see Equation 15) such as w1, w2, $S_w$. Archie's exponents m and n are measured from core plugs with similar formation type as the reservoir at block 524 to perform the correlation at block 510, for example. At block 522, multi-frequency dielectric data ($\varepsilon_{meas}$) is acquired from any core plug or any reservoir depth at $S_w=1$, which are then used to measure Archie's exponents m and n from core plugs with similar formation type as the reservoir at block 524 to perform the correlation at block 510, for example.

At block 512, Archie's exponents m and n are computed from the multi-frequency dielectric data ($\varepsilon_{meas}$) of any core plug or any reservoir depth.

Additional processes also may be included, and it should be understood that the process depicted in FIG. 5 represents an illustration, and that other processes may be added or existing processes may be removed, modified, or rearranged without departing from the scope of the present disclosure.

According to another example, techniques for evaluate petrophysical textural parameters based on acoustic velocity and multi-frequency dielectric logging data are also provided. The textural parameters include Archie's cementation and saturation exponents m and n using integrated workflow of combining acoustic and dielectric logging and/or core measurements.

As an example, a method to evaluate petrophysical textural parameters based on acoustic velocity and multi-frequency dielectric logging data is provided. The textural parameters include Archie's cementation and saturation exponents (m and n respectively) using an integrated workflow of combining acoustic and dielectric logging and/or core measurements. The presented method employs an integrated set of logging data comprompising acoustic velocity and multi-frequency dielectric measurements of near wellbore to estimate deep formation properties described by Archie's cementation and saturation exponents m and n. It describes a workflow and mathematical expressions to evaluate these exponents reliably without unrealistic assumptions and reduced dependency on pore space fluids properties or rock texture.

According to one or more embodiments described herein, a method includes a novel workflow utilizing both acoustic velocity and multi-frequency dielectric data to estimate both Archie's m and n accurately. The disclosed method eliminates the unrealistic assumptions of similarity of rock types and pore structures and reduces the influence of water saturation on the derived Archie's exponents. Also, in some circumstances, the present techniques can avoid the need of core measurements by establishing a reasonable correlation from the logging data alone. Such method can estimate reliably Archie's m and n from the near wellbore invaded zone for any complex reservoir and then utilized to predict fluids saturation of the virgin zone from the same lateral of the acquired data.

In one embodiment, acoustic compressional and/or shear velocities are used to estimate cementation exponent m for any partially saturated formation at any particular depth. From the computed m exponent, one can estimate the saturation exponent n by utilizing multi-frequency dielectric and conductivity measurements on the corresponding depth and effective medium theory mixing model. This process utilizes the relationship between the inverted geometrical parameter from the said model and both m and n exponents.

In one aspect, the zero frequency fitting of the multi-frequency conductivity fitting of the effective medium theory mixing model is equated to Archie's expression to estimate saturation exponent n. This process requires using water-filled porosity derived from applying high frequency dielectric measurement, m exponent derived from acoustic velocity logging data and total porosity from another independent logging data such as neutron and density logs.

In one aspect, an empirical correlation derived from laboratory core data is used to compute formation factor or cementation exponent m from acoustic velocity measurements. Also, one can use logging data at water bearing zone to calibrate the relation between acoustic velocity measurements and cementation exponent m by using multi-frequency dielectric data geometrical parameter.

In one aspect, formation properties derived from multi-frequency dielectric measurements and acoustic velocity measurements are compared at water bearing zones and extract a metric which is related to Archie's cementation exponent m. Similar workflow can be also done using cores data fully saturated with conducting water and utilize the resulting correlation in downhole to derive saturation exponent n from multi-frequency dielectric measurements.

Knowledge of fluids saturation from electrical resistivity measurement in porous media is govern typically by applying Archie's equation. Such equation relates a formation resistivity ($R_t$) to saturating brine resistivity ($R_w$), porosity (Ø) and water saturation ($S_w$) with some exponents; cementation exponent (m) and saturation exponent (n) as shown in Equation 1 herein.

Archie's exponents m and n are either assumed to be a constant value, or determined from laboratory core measurements which are expensive and time consuming. The exponent m reflects information about rock's texture such as grains shape or size distribution and how they are compacted, whereas saturation exponent n reflects how the water-phase is distributed inside the pore space and the wetting condition of the grains. The total porosity (Ø) is typically obtained from another independent measurement such as neutron and density logs.

The dielectric constant or permittivity of a medium is defined as the amount of energy stored or dissipated per unit volume as electrical field passes through it and expressed as a complex number ($\varepsilon^*$) as defined by Equation 2, and the dielectric constant is a function of frequency as described herein.

Dielectric measurement at plurality of frequencies between 10 MHz and 1 GHz can be obtained by using a group of transmitters and receivers that fire and receive electromagnetic waves inside the formation. Acoustic velocity measurements can be obtained by transmitting and receiving elastic compressional or shear waves inside the formation. Both wireline logging tools should measure relatively similar depth of investigation where at least pore structure or cementation exponent should not change on the same lateral. Deriving formation petrophysical properties from dielectric dispersion data depends on the polarization mechanism occurring in the water-phase inside a porous media. The acoustic velocity measurement has higher sensitivity to the rock fabric and pores connectivity.

Dielectric measurement can estimate the proportion of pores filled by water in a representative volume measured irrespective of rock texture or fluids conductivity. Several models can be used the CRIM described herein (see Equation 6). For a porous media partially saturated by water and oil, CRIM model is expressed as:

$$\sqrt{\varepsilon_{CRIM}} = \emptyset S_w \sqrt{\varepsilon_w} + \emptyset(1-S_w)\sqrt{\varepsilon_{oil}} + (1-\emptyset)\sqrt{\varepsilon_m} \quad (16)$$

where $\varepsilon_{CRIM}$ is the effective dielectric constant of the mixture, $\varepsilon_w$ is the permittivity of water, $\varepsilon_{oil}$ is the permittivity of oil, $\varepsilon_m$ is the solid matrix or grains permittivity, Ø is the porosity of the medium and $S_w$ is the water saturation. CRIM model is only volumetric based mixing model and applicable for describing molecular polarization which occurs up to GHz frequency range.

There are other models that also capture information about the geometry of the constitutes as in as follows in Equation 17:

$$\varepsilon^* = \emptyset_w^{m^*}\varepsilon_w + (1-\emptyset_w^{m^*})\varepsilon_m - \varepsilon_m h(s) \quad (17)$$

where m* is the apparent Archie's law cementation exponent, which can be precisely expressed as water-phase tortuosity, s is equal to $\varepsilon_m/(\varepsilon_w - \varepsilon_m)$ and h(s) can be evaluated numerically.

In fully brine saturated medium, apparent cementation exponent m* is equivalent to Archie's cementation exponent m. It is possible to probe such formation by comparing total porosity from neutron density logging data and water-filled porosity from dielectric data using either Equation 16 or Equation 17 or any other dielectric mixing model. Such condition could be feasible in water-bearing intervals. At those intervals, the computed m* from dielectric logging data can be correlated with acoustic velocity measurements such as: compressional wave velocity ($V_p$), shear wave velocity ($V_s$) or the ratio of both ($V_p/V_s$). Since the acoustic wave's sensitivity to saturation level is extremely low due low density contrast between water and hydrocarbon fluids, the derived correlation function can be used to compute Archie's cementation exponent m at partially water filled gas-free intervals from acoustic velocity data.

If such water-bearing intervals are not available, some core plugs can be extracted from the same well, cleaned and fully saturated by brine to correlate their Archie's cementation exponent m with the obtained acoustic velocities. Similar procedure and workflow can be found where compressional velocity of sufficiently large number (e.g., about 400 or more) of core plugs are correlated to resistivity formation factor (FF) or cementation exponent m by the following Equation 18:

$$V_p = a - b \log(FF) \quad (18)$$

where a and b are constants obtained from fitting core data and $FF = \emptyset^{-m}$.

Another method to extract Archie's cementation exponent m from acoustic velocity data is by relating the secondary porosity, which is the difference between the total porosity (Ø) and primary inter-granular porosity ($\emptyset_p$) obtained from time-averaging model as expressed in Equation 19:

$$\frac{1}{V_p} = \frac{1-\emptyset_p}{V_{pS}} + \frac{\emptyset_p}{V_{pF}} \quad (19)$$

where $V_p$ is the measured compressional velocity, $V_{pS}$ is the velocity in matrix (grains) and $V_{pF}$ is the velocity in the saturating fluid. This secondary porosity is oftenly related to presence of vugs and fractures which impacts the connectivity of the pore structure and alter cementation exponent m. This correlation between acoustic secondary porosity and cementation exponent m can be obtained either from dielectric or resistivity logging data in water-bearing zones or from core data in addition of obtaining acoustic velocity and density/neutron total porosity measurements.

To obtain the Archie's saturation exponent n, one can utilize dielectric dispersion apparent cementation exponent m* obtained from Equation 17 or any other dielectric mixing model. The relation between the apparent cementation exponent m* and Archie's (m) and (n) can be expressed as in Equation 20:

$$(\emptyset S_w)^{m^*} = S_w^n \emptyset^m \quad (20)$$

where the cementation exponent m is obtained for any interval using the correlation constructed as explained previously from acoustic velocity data.

In another aspect, one can use the derived cementation exponent m from acoustic velocity measurement and relate it to the previously defined parameter w2 to reduce the degree of unknowns in Equations 13 or 14, for example, by one variable. Hence, fitting measured multifrequency dielectric measurement with a mixing model as in Equation 15, will lead to an estimation to saturation exponent n.

The resulting n value can be used to determine the wettability of the respective interval in any formation. The detailed method to obtain Archie's m exponent from acoustic and dielectric logging data can be coupled to resistivity multiple array multiple depth of investigation data to derive saturation exponent n at different depth of investigations to evaluate water-flooding efficiency or mud invasion and wettability alteration associated.

FIG. 6 depicts a flow diagram of a method 600 for evaluating petrophysical textural parameters based on acoustic velocity measurements and multi-frequency dielectric logging measurements according to one or more embodiments described herein. The method 600 can be performed by any suitable processing device or processing system, such as the processing system 12 of FIGS. 1 and 2.

At block 602, multi-frequency dielectric measurements are acquired at a plurality of frequencies using a plurality of transmitters. At block 604, the acoustic velocity measurements are acquired by transmitting and receiving elastic compressional or shear waves inside a formation. At block 606, a cementation exponent (m) is estimated from the acoustic velocity measurements for a partially saturated formation at a depth. At block 608, a saturation exponent (n) is estimated using the cementation exponent (m) based at least in part on the multi-frequency dielectric measurements corresponding to the depth and a dielectric mixing model. At block 610, a formation property is estimated based at least in part on the cementation exponent (m) and the saturation exponent (n). At block 612, a wellbore operation is controlled based at least in part on the formation property. For example, an autonomous drilling system can be used to autonomously control a drilling rig based at least in part on the formation property.

Additional processes also may be included, and it should be understood that the process depicted in FIG. 6 represents an illustration, and that other processes may be added or existing processes may be removed, modified, or rearranged without departing from the scope of the present disclosure.

Example embodiments of the disclosure include or yield various technical features, technical effects, and/or improvements to technology. Example embodiments of the disclosure provide technical solutions for deriving textural properties of a reservoir formation using multi-frequency dielectric logging measurements or using acoustic velocity measurements and multi-frequency dielectric logging measurements. These technical solutions provide a less subjective, automated approach to determine the cementation and saturation exponents of Archie's equation. Accordingly, the present techniques provide a more accurate determination of the cementation and saturation exponents by eliminating conventional assumptions related to saturation variation or constant formation pore structure or rock type which is not always feasible or precisely estimated downhole. This increases hydrocarbon recovery from a hydrocarbon reservoir compared to conventional techniques because the relationship between formation resistivity and water saturation can be more accurately determined and used to estimate oil reserves.

Set forth below are some embodiments of the foregoing disclosure:

Embodiment 1: A method for deriving textural properties of a reservoir formation, the method comprising: acquiring multi-frequency dielectric data ($\varepsilon_{meas}$); applying a dielectric mixing model between different fluid phases to generate an effective fluid permittivity ($\varepsilon_{fluid}$) by mixing the permittivity of water and hydrocarbon fluids; applying the dielectric mixing model between the effective fluid permittivity ($\varepsilon_{fluid}$) and a matrix permittivity ($\varepsilon_m$); minimizing a difference between a measured dielectric response and the dielectric mixing model by optimizing model parameters; computing a cementation exponent (m) and a saturation exponent (n) from the multi-frequency dielectric data ($\varepsilon_{meas}$); estimating a formation property based at least in part on the cementation exponent (m) and the saturation exponent (n); and controlling a wellbore operation based at least in part on the formation property.

Embodiment 2: A method according to any prior embodiment, wherein the effective permittivity ($\varepsilon_{eff}$) for a porous media, partially filled with water and hydrocarbon fluids, is expressed as:

$$\varepsilon_{eff} = \psi(\emptyset, S_w, \varepsilon_w, \varepsilon_m, \varepsilon_{HC}, \lambda_w, \lambda_{HC}, \lambda_m)$$

where $\psi$ represents a mixing model, $\varepsilon_{eff}$ is an effective dielectric constant of the mixture, $\varepsilon_w$ is a permittivity of water, $\varepsilon_{HC}$ is a permittivity of hydrocarbon, $\varepsilon_m$ is a solid matrix or grains permittivity, $\emptyset$ is a porosity of a medium, $S_w$ is a water saturation, $\lambda_w$ is a textural parameter related to water phase, $\lambda_{HC}$ is a textural parameter related to hydrocarbon phase, and $\lambda_m$ is a textural parameter related to matrix.

Embodiment 3: A method according to any prior embodiment, wherein the multi-frequency dielectric data ($\varepsilon_{meas}$) is measured from the formation.

Embodiment 4: A method according to any prior embodiment, further comprising computing the matrix permittivity ($\varepsilon_m$) from different minerals.

Embodiment 5: A method according to any prior embodiment, further comprising measuring a measured cementation exponent (m) and a measured saturation exponent (n) from a plurality of core plugs with a formation type similar to a type of the formation.

Embodiment 6: A method according to any prior embodiment, wherein minimizing the difference between the measured dielectric response and the dielectric mixing model comprises optimizing a water saturation, a textural parameter for water/oil interfaces, and a textural parameter for fluids/matrix interfaces.

Embodiment 7: A method according to any prior embodiment, further comprising: correlating between the measured cementation exponent (m) and the textural parameter for fluids/matrix interfaces; and correlating between the measured saturation exponent (n) and textural parameter for water/oil interfaces.

Embodiment 8: A method according to any prior embodiment, wherein dielectric mixing model accounts for a polarization between different fluid phases to extract a textural parameter related to the saturation exponent (n), and the polarization between solid phase and mixed fluid phases and extract a parameter related to the cementation exponent (m).

Embodiment 9: A method according to any prior embodiment, wherein controlling the wellbore operation based at least in part on the formation property comprises causing, by an autonomous drilling system, a drilling rig to be autonomously controlled based at least in part on the formation property.

Embodiment 10: A method for evaluating petrophysical textural parameters based on acoustic velocity measurements and multi-frequency dielectric logging measurements, the method comprising: acquiring the multi-frequency dielectric measurements at a plurality of frequencies using a plurality of transmitters; acquiring the acoustic velocity measurements by transmitting and receiving elastic compressional or shear waves inside a formation; estimating a cementation exponent (m) from the acoustic velocity measurements for a partially saturated formation at a depth; estimating a saturation exponent (n) using the cementation exponent (m) based at least in part on the multi-frequency dielectric measurements corresponding to the depth and a dielectric mixing model; estimating a formation property based at least in part on the cementation exponent (m) and the saturation exponent (n); and controlling a wellbore operation based at least in part on the formation property.

Embodiment 11: A method according to any prior embodiment, further comprising comparing a total porosity from neutron density logging data and water-filled porosity from dielectric data.

Embodiment 12: A method according to any prior embodiment, wherein the comparing is performed using the following equation:

$$\sqrt{\varepsilon_{CRIM}} = \emptyset S_w \sqrt{\varepsilon_w} + \emptyset(1-S_w)\sqrt{\varepsilon_{oil}} + (1-\emptyset)\sqrt{\varepsilon_m}$$

where $\varepsilon_{CRIM}$ is an effective dielectric constant of a mixture, $\varepsilon_w$ is a permittivity of water, $\varepsilon_{oil}$ is a permittivity of oil, $\varepsilon_m$ is a solid matrix or grains permittivity, Ø is a porosity of a medium, and $S_w$ is a water saturation.

Embodiment 13: A method according to any prior embodiment, wherein the comparing is performed using the following equation:

$$\varepsilon^* = \emptyset_w^{m^*}\varepsilon_w + (1-\emptyset_w^{m^*})\varepsilon_m - \varepsilon_m h(s)$$

where m* is an apparent Archie's law cementation exponent, which is expressed as water-phase tortuosity, s is equal to $\varepsilon_m/(\varepsilon_w - \varepsilon_m)$, and h(s) is evaluated numerically.

Embodiment 14: A method according to any prior embodiment, wherein the wellbore operation is one of a wireline logging operation or a logging while drilling operation.

Embodiment 15: A method according to any prior embodiment, wherein controlling the wellbore operation based at least in part on the formation property comprises causing, by an autonomous drilling system, a drilling rig to be autonomously controlled based at least in part on the formation property.

The use of the terms "a" and "an" and "the" and similar referents in the context of describing the present disclosure (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure can be used in a variety of well operations. These operations can involve using one or more treatment agents to treat a formation, the fluids resident in a formation, a wellbore, and/or equipment in the wellbore, such as production tubing. The treatment agents can be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the present disclosure has been described with reference to an exemplary embodiment or embodiments, it will be understood by those skilled in the art that various changes can be made and equivalents can be substituted for elements thereof without departing from the scope of the present disclosure. In addition, many modifications can be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims. Also, in the drawings and the description, there have been disclosed exemplary embodiments of the present disclosure and, although specific terms can have been employed, they are unless otherwise stated used in a generic and descriptive sense only and not for purposes of limitation, the scope of the present disclosure therefore not being so limited.

What is claimed is:

1. A method for deriving textural properties of a reservoir formation, the method comprising:
   acquiring multi-frequency dielectric data ($\varepsilon_{meas}$);
   applying a dielectric mixing model between different fluid phases to generate an effective fluid permittivity ($\varepsilon_{fluid}$) by mixing the permittivity of water and hydrocarbon fluids;
   applying the dielectric mixing model between the effective fluid permittivity ($\varepsilon_{fluid}$) and a matrix permittivity ($\varepsilon_m$) to generate an effective permittivity ($\varepsilon_{eff}$);
   minimizing a difference between a measured dielectric response and the effective permittivity by optimizing model parameters, wherein minimizing the difference between the measured dielectric response and the effective permittivity comprises optimizing a water saturation, a textural parameter for water/oil interfaces, and a textural parameter for fluids/matrix interfaces;
   computing a cementation exponent (m) and a saturation exponent (n) from the multi-frequency dielectric data ($\varepsilon_{meas}$);
   estimating a textural property of the reservoir formation based at least in part on the cementation exponent (m) and the saturation exponent (n); and
   controlling a wellbore operation based at least in part on the textural property of the reservoir formatiom.

2. The method of claim 1, wherein the effective permittivity ($\varepsilon_{eff}$) for a porous media, partially filled with water and hydrocarbon fluids, is expressed as:

$$\varepsilon_{eff} = \psi(\emptyset, S_w, \varepsilon_w, \varepsilon_m, \varepsilon_{HC}, \lambda_w, \lambda_{HC}, \lambda_m)$$

where ψ represents the dielectric mixing model, $\varepsilon_{eff}$ is the effective, $\varepsilon_w$ is a permittivity of water, $\varepsilon_{HC}$ is a permittivity of hydrocarbon, $\varepsilon_m$ is the matrix permittivity, Ø is a porosity of a medium, $S_w$ is a water saturation, $\lambda_w$ is a textural parameter related to water phase, $\lambda_{HC}$ is a textural parameter related to hydrocarbon phase, and $\lambda_m$ is a textural parameter related to a matrix.

3. The method of claim 1, wherein the multi-frequency dielectric data ($\varepsilon_{meas}$) is measured from the reservoir formation.

4. The method of claim 1, further comprising computing the matrix permittivity ($\varepsilon_m$) from different minerals.

5. The method of claim 4, further comprising measuring a measured cementation exponent (m) and a measured saturation exponent (n) from a plurality of core plugs with a formation type similar to a type of the reservoir formation.

6. The method of claim 5, further comprising:
   correlating between the measured cementation exponent (m) and the textural parameter for fluids/matrix interfaces; and
   correlating between the measured saturation exponent (n) and the textural parameter for water/oil interfaces.

7. The method of claim 1, wherein the dielectric mixing model accounts for a polarization between different fluid phases to extract a textural parameter related to the saturation exponent (n), and a polarization between a matrix and the different fluid phases to extract a textural parameter related to the cementation exponent (m).

8. The method of claim 1, wherein controlling the wellbore operation based at least in part on the textural property of the reservoir formation comprises causing, by an autonomous drilling system, a drilling rig to be autonomously controlled based at least in part on the textural property of the reservoir formation.

9. A method for evaluating petrophysical textural parameters based on acoustic velocity measurements and multi-frequency dielectric measurements, the method comprising:
acquiring the multi-frequency dielectric measurements at a plurality of frequencies using a plurality of transmitters, the multi-frequency dielectric measurements performed at a partially saturated formation at a first depth;
acquiring the acoustic velocity measurements by transmitting and receiving elastic compressional or shear waves inside the partially saturated formation at the first depth;
integrating the acoustic velocity measurements into a dielectric mixing model, the dielectric mixing model generated by mixing a permittivity of multiple fluids in a fluid mixture, to provide an effective permittivity of the multiple fluids and a matrix permittivity;
estimating a textural parameter ($\lambda_{fluid}$) of the fluid mixture or a saturation exponent (n) related to the textural parameter, wherein the estimating includes substituting a matrix textural parameter ($\lambda_m$) or a related cementation exponent (m) with a function that includes at least one of a compressional wave velocity ($V_p$), a shear wave velocity ($V_s$), and a ratio of the compressional wave velocity ($V_p$) to the shear wave velocity ($V_s$); and
controlling a wellbore operation based at least in part on the textural parameter ($\lambda_{fluid}$) of the fluid mixture.

10. The method of claim 9, further comprising comparing a measured multi-frequency dielectric constant of the partially saturated formation and a dielectric constant calculated from the dielectric mixing model.

11. The method of claim 10, wherein the comparing is performed using the following equation:

$$\varepsilon_{eff} = \psi(\varnothing, S_w, \varepsilon_w, \varepsilon_m, \varepsilon_{HC}, \lambda_w, \lambda_{HC}, \alpha V_p)$$

wherein $\psi$ is the dielectric mixing model, $\varepsilon_{eff}$ is the effective permittivity of the multiple fluids, $\varnothing$ is a porosity of a medium, $S_w$ is a water saturation, $\varepsilon_w$ is a permittivity of water, $\varepsilon_m$ is the matrix permittivity, $\varepsilon_{HC}$ is a permittivity of a hydrocarbon, $\lambda_w$ is a textural parameter related to a water phase, $\lambda_{HC}$ is a textural parameter related to a hydrocarbon phase, and $\alpha$ is a proportionality constant to relate the compressional wave velocity ($V_p$) with the cementation exponent (m) from standard core analysis.

12. The method of claim 11, wherein the compressional wave velocity ($V_p$) is substituted by another acoustic measurement.

13. The method of claim 10, wherein the wellbore operation is one of a wireline logging operation or a logging while drilling operation.

14. The method of claim 9, wherein controlling the wellbore operation based at least in part on the textural parameter of the fluid mixture comprises causing, by an autonomous drilling system, a drilling rig to be autonomously controlled based at least in part on the textural parameter of the fluid mixture.

15. The method of claim 12, wherein the another acoustic measurement includes at least one of the shear wave velocity ($V_s$) and the ratio of the compressional wave velocity ($V_p$) to the shear wave velocity ($V_s$).

16. The method of claim 12, further comprising obtaining the function by comparing the compressional wave velocity ($V_p$), the shear wave velocity ($V_s$), or the ratio of the compressional wave velocity ($V_p$) to the shear wave velocity ($V_s$) to the matrix textural parameter or a cementation exponent for a formation region having a formation type that is similar to the partially saturated formation at the first depth.

* * * * *